(12) United States Patent
Chen

(10) Patent No.: US 7,413,152 B1
(45) Date of Patent: Aug. 19, 2008

(54) CARRIER DEVICE FOR MONITOR

(75) Inventor: Hsin Hao Chen, Taipei Hsien (TW)

(73) Assignee: Kernan Technology Co., Ltd., Sinjuan, Taipei Hsien (TW)

( * ) Notice: Subject to any disclaimer, the term of this patent is extended or adjusted under 35 U.S.C. 154(b) by 15 days.

(21) Appl. No.: 11/703,616

(22) Filed: Feb. 6, 2007

(51) Int. Cl.
*F16M 11/00* (2006.01)

(52) U.S. Cl. ............... 248/176.1; 248/220.22; 248/222.14; 248/276.1; 248/281.11; 248/284.1; 248/917; 361/681; 16/233; 16/239

(58) Field of Classification Search ............ 248/176.1, 248/220.22, 221.11, 222.14, 276.1, 280.11, 248/281.11, 284.1, 291.1, 917, 918, 919, 248/920, 921; 361/681, 682, 683; 16/233, 16/235, 236, 239, 240, 247
See application file for complete search history.

(56) References Cited

U.S. PATENT DOCUMENTS

| | | | |
|---|---|---|---|
| 5,924,666 A | | 7/1999 | Liu .......................... 248/286 |
| 5,975,472 A | * | 11/1999 | Hung ..................... 248/278.1 |
| 6,027,090 A | * | 2/2000 | Liu ...................... 248/281.11 |
| 6,199,809 B1 | * | 3/2001 | Hung ..................... 248/284.1 |
| 6,478,275 B1 | | 11/2002 | Huang .................... 248/284.1 |
| 6,533,229 B1 | * | 3/2003 | Hung ..................... 248/286.1 |
| 6,695,274 B1 | * | 2/2004 | Chiu .......................... 248/371 |
| 6,769,657 B1 | * | 8/2004 | Huang .................... 248/278.1 |
| 6,929,228 B2 | * | 8/2005 | Whitaker et al. ......... 248/284.1 |
| 7,334,765 B2 | * | 2/2008 | Hwang ................... 248/284.1 |
| 2004/0245419 A1 | * | 12/2004 | Sweere et al. ............ 248/276.1 |
| 2007/0001076 A1 | * | 1/2007 | Asamarai et al. ....... 248/281.11 |
| 2007/0058329 A1 | * | 3/2007 | Ledbetter et al. ............ 361/681 |

* cited by examiner

*Primary Examiner*—Toan C To
(74) *Attorney, Agent, or Firm*—Charles E. Baxley

(57) ABSTRACT

A carrier device includes a supporting base having one or more columns, a mounting seat for supporting an object and having an arm, and a linkage for adjustably coupling and supporting the mounting seat to the supporting base to the selected angular positions without spring members. Two or more fastener each include a non-circular shank engaged through one or more discs, and a pair of levers are disposed parallel to each other and pivotally coupled between the fasteners for forming a parallelogrammic structure and for adjustably and stably supporting the mounting seat to the columns of the supporting base at selected angular position.

13 Claims, 5 Drawing Sheets

CARRIER DEVICE FOR MONITOR

BACKGROUND OF THE INVENTION

1. Field of the Invention

The present invention relates to a carrier device for supporting various objects, such as monitors, keyboards, or the like and more particularly to a carrier device including an improved structure for stably supporting the objects or the like at the selected or suitable angular position and for preventing the carrier device from being collapsed.

2. Description of the Prior Art

Typical carrier devices for supporting such as monitors or keyboards comprise a mounting seat for attaching or coupling to the monitors or the keyboards, and a movable seat and an engaging plate pivotally coupling the mounting seat to a carrier plate for pivotally coupling and supporting the monitors or the keyboards to the carrier plate and for adjustably supporting the monitors or the keyboards at the selected or suitable or predetermined angular position relative to the carrier plate.

For example, U.S. Pat. No. 5,924,666 to Liu discloses one of the typical carrier devices comprising a movable seat and an engaging plate disposed parallel to each other and pivotally coupled between a carrier plate and a mounting seat in which the mounting seat may be used for supporting the monitors or the keyboards, and thus for allowing the monitors or the keyboards and the carrier plate to be adjustably supported at the selected or suitable or predetermined angular position relative to the carrier plate.

However, the movable seat and the engaging plate are pivotally coupled between the carrier plate and the mounting seat with a spring member such that the spring member may sustain a great force or a great weight of the monitors or the keyboards and the carrier plate and such that the spring member may have a good chance to become failure after use.

U.S. Pat. No. 6,199,809 to Hung discloses another typical support device comprising a support for supporting the monitors or the keyboards or the like thereon, and a frame and a link disposed parallel to each other and pivotally coupled between a base and the support, and a spring biasing device coupled between the base and the support for adjustably supporting the monitors or the keyboards at the selected or suitable or predetermined angular position relative to the base.

However, the spring member or the spring biasing device is pivotally coupled between the base and the support and may sustain a great force or a great weight of the monitors or the keyboards and the support such that the spring member or the spring biasing device may have a good chance to become failure after use.

U.S. Pat. No. 6,478,275 to Huang discloses a further typical support device comprising a bracket and a frame for supporting the monitors or the displayers or the keyboards or the like thereon, and an arm and a lever disposed parallel to each other and pivotally coupled between the bracket and a base, and a spring coupled between the base and the bracket and/or the frame for adjustably supporting the monitors or the keyboards at the selected or suitable or predetermined angular position relative to the base.

However, the spring is pivotally coupled between the base and the bracket and/or the frame and may sustain a great force or a great weight of the monitors or the keyboards and the bracket and the frame such that the spring may have a good chance to become failure after use.

The present invention has arisen to mitigate and/or obviate the afore-described disadvantages of the conventional carrier devices for supporting the monitors or the displayers or the keyboards or the like.

SUMMARY OF THE INVENTION

The primary objective of the present invention is to provide a carrier device including an improved structure for stably supporting the objects or the like at the selected or suitable angular position and for preventing the carrier device from being collapsed.

In accordance with one aspect of the invention, there is provided a carrier device comprising a supporting base including at least one column extended therefrom, a mounting seat for attaching to an object and including an arm extended from the mounting seat, a linkage including a bar having a first end and a second end, a first fastener including a non-circular shank engaged through the first end of the bar and the column of the supporting base, a first disc including a non-circular bore formed therein for engaging with the non-circular shank the first fastener and for coupling the first disc to the first fastener and for preventing the first disc from being rotated relative to the first fastener, a second fastener including a non-circular shank engaged through the second end of the bar and the arm of the mounting seat, a second disc including a non-circular bore formed therein for engaging with the non-circular shank of the second fastener and for coupling the second disc to the second fastener and for preventing the second disc from being rotated relative to the second fastener, and a pair of levers disposed parallel to each other and attached to the bar of the linkage and having end portions pivotally coupled to the first disc and the second disc for forming a parallelogrammic structure and for stably supporting the mounting seat to the column of the supporting base and for allowing the bar of the linkage to be rotated and adjusted relative to the column of the supporting base to a selected angular position.

The column of the supporting base includes a stop extended therefrom for engaging with the linkage and for limiting the linkage to rotate relative to the column of the supporting base. The linkage includes a linking plate extended from the bar and for engaging with the stop of the column of the supporting base.

The supporting base includes a bracket having the column extended from the bracket. The supporting base includes a barrel disposed on top of the column of the supporting base, and the non-circular shank of the first fastener is engaged through the barrel.

The first fastener includes an anti-friction washer attached thereon for frictionally engaging with the first disc. The second fastener includes an anti-friction washer attached thereon for frictionally engaging with the second disc.

The second fastener includes a positioning plate attached thereon and rotated in concert with the second fastener for positioning the arm of the mounting seat to the second end of the bar. The mounting seat includes an anchor plate attached thereon and rotated in concert with the arm of the mounting seat for engaging with the positioning plate and for positioning the arm of the mounting seat to the second end of the bar.

The anchor plate includes at least one depression formed therein, and the positioning plate includes at least one catch extended therefrom for engaging with the depression of the anchor plate and for adjustably positioning the positioning plate to the anchor plate and the arm of the mounting seat to the selected angular position.

The anchor plate includes at least one orifice formed therein, and the mounting seat includes at least one peg extended from the arm for engaging with the orifice of the anchor plate and for securing the anchor plate to the arm of the mounting seat.

The positioning plate includes a projection extended therefrom for engaging with the arm of the mounting seat and for limiting the arm of the mounting seat to rotate relative to the positioning plate and for preventing the arm of the mounting seat from being over rotated relative to the positioning plates. The mounting seat includes a notch formed in the arm for selectively receiving the projection of the positioning plate.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial perspective view of a carrier device in accordance with the present invention for supporting a monitor or a displayer or a keyboard or the like;

DETAILED DESCRIPTION OF THE PREFERRED EMBODIMENT

Figure 1:
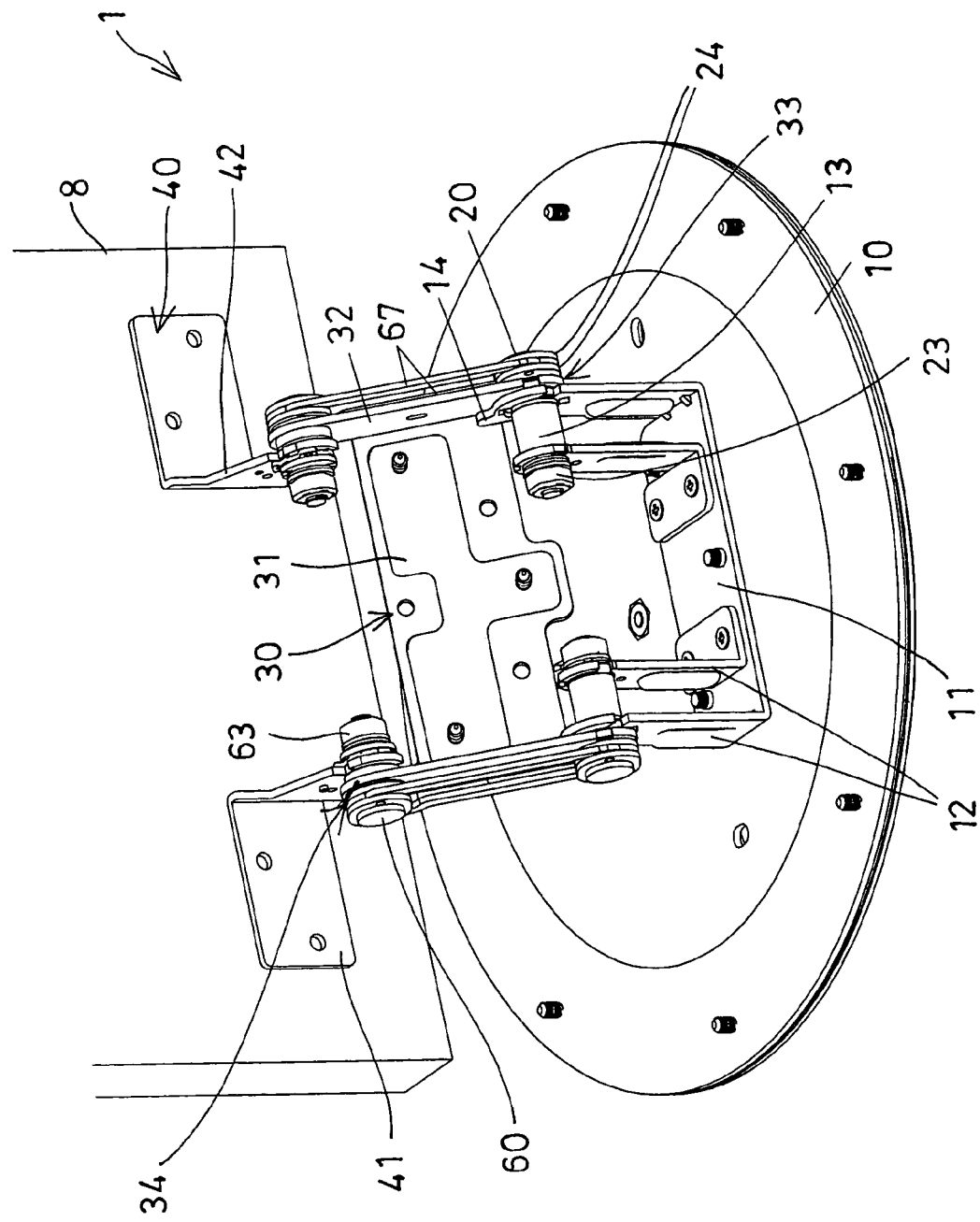

Referring to the drawings, and initially to FIGS. 1-4, a carrier device 1 in accordance with the present invention is provided for supporting various objects 8, such as displayers, monitors 8 (FIGS. 1 and 4-6), keyboards, or the like, and for adjustably supporting the monitors 8 or the displayers or the keyboards at the selected or suitable or predetermined angular position relative to the supporting table (not shown) or the like, and comprises a supporting base 10 including a bracket 11 having one or more (such as two) pairs of columns 12 attached or extended from the supporting base 10, one or more (such as two) hubs or barrels 13 attached or disposed on top of the pairs of the columns 12, and one or more of the columns 12 each including a stop 14 extended outwardly therefrom from such as the upper portion thereof.

One or more (such as two) fasteners 20 each include a shank 21 having a non-circular cross section engaged through the corresponding barrel 13 and having an outer thread 22 formed on one end portion thereof for threading or engaging with a lock nut 23. One or more (such as two) washers or discs 24 are attached or engaged onto each of the fasteners 20 and each include a non-circular bore 25 formed therein for engaging with the non-circular shank 21 and for solidly attaching or coupling the discs 24 to the fasteners 20 and for preventing the discs 24 from being rotated relative to the fasteners 20. One or more anti-friction washers 26 may further be provided and engaged with the discs 24 and/or the columns 12 for frictionally coupling the discs 24 and the fasteners 20 to the columns 12.

A mount fixture or linkage 30 includes a linking plate 31 and one or more (such as two) flaps or bars 32 extended from such as the two side portions of the linking plate 31, and the bars 32 each include one end 33 rotatably or pivotally coupled to the columns 12 with the fasteners 20 for allowing the linkage 30 to be rotatably or pivotally coupled or attached or secured to the columns 12 of the supporting base 10. The stops 14 of the columns 12 of the supporting base 10 may be engaged with such as the linking plate 31 of the linkage 30 (FIG. 2) in order to limit the rotational movement of the linkage 30 relative to the columns 12 of the supporting base 10 and for preventing the linkage 30 from being over rotated relative to the columns 12 of the supporting base 10.

One or more (such as two) mounting seats 40 are to be rotatably or pivotally coupled to the other end portions 34 of the bars 32 with such as fasteners 60 for coupling or attaching or securing to the object 8. For example, the mounting seats 40 each include a flap 41 for attaching or securing to the object 8, and an arm 42 extended from the flap 41 and preferably perpendicular to the flap 41, and one or more pegs 43 extended from each of the arms 42 (FIGS. 2, 3), and a notch 44 formed in each of the arms 42 (FIG. 3). One or more (such as two) anchor plates 45 are attached or engaged onto the respective fasteners 60 and each include one or more orifices 46 formed therein for engaging with the pegs 43 of the arms 42 and for solidly attaching or securing the anchor plates 45 to the arms 42 and for preventing the anchor plates 45 from being rotated relative to the arms 42.

Figure 2:
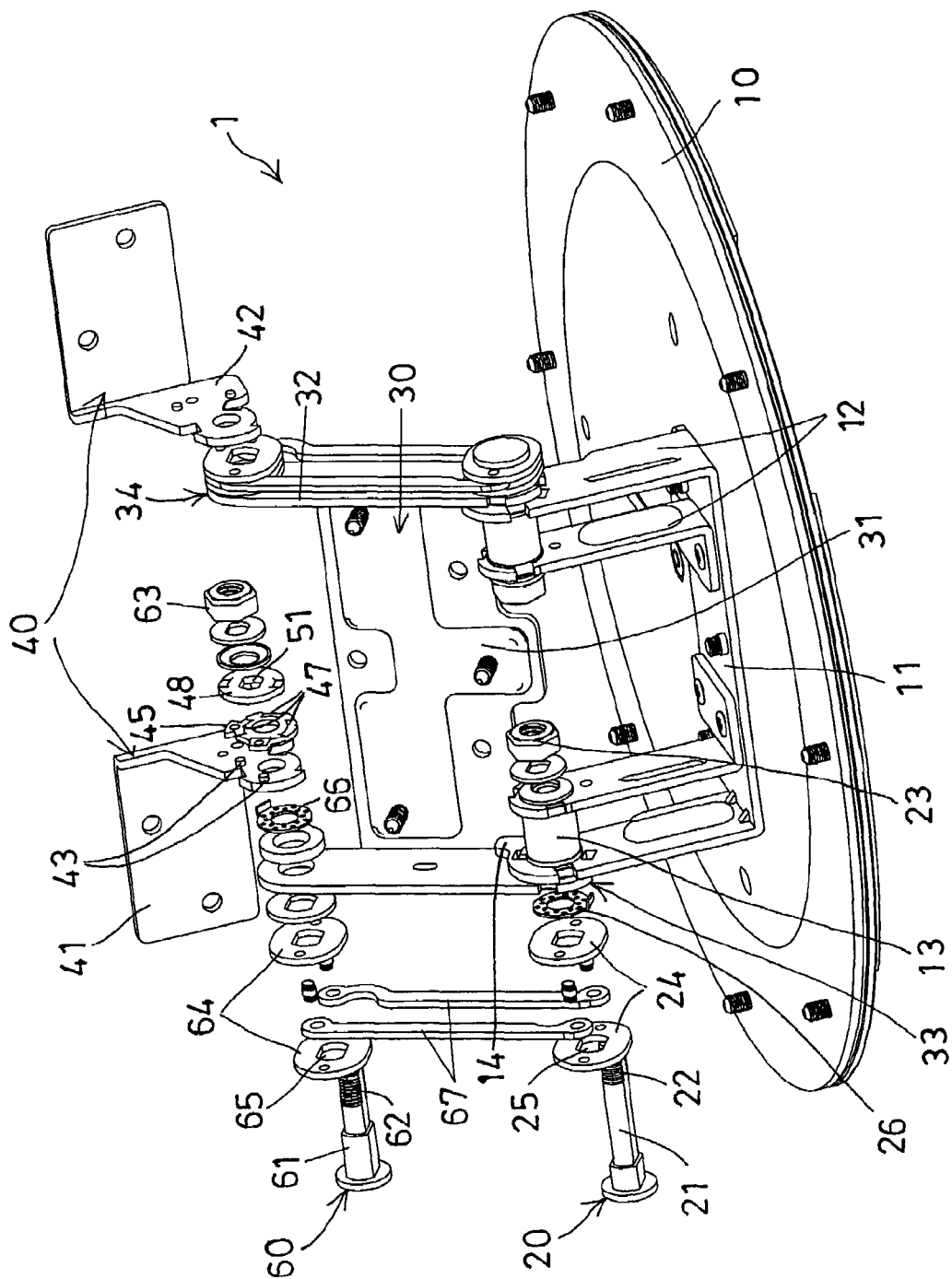
FIG. 2 is a partial exploded view of the carrier device.
Figure 3:
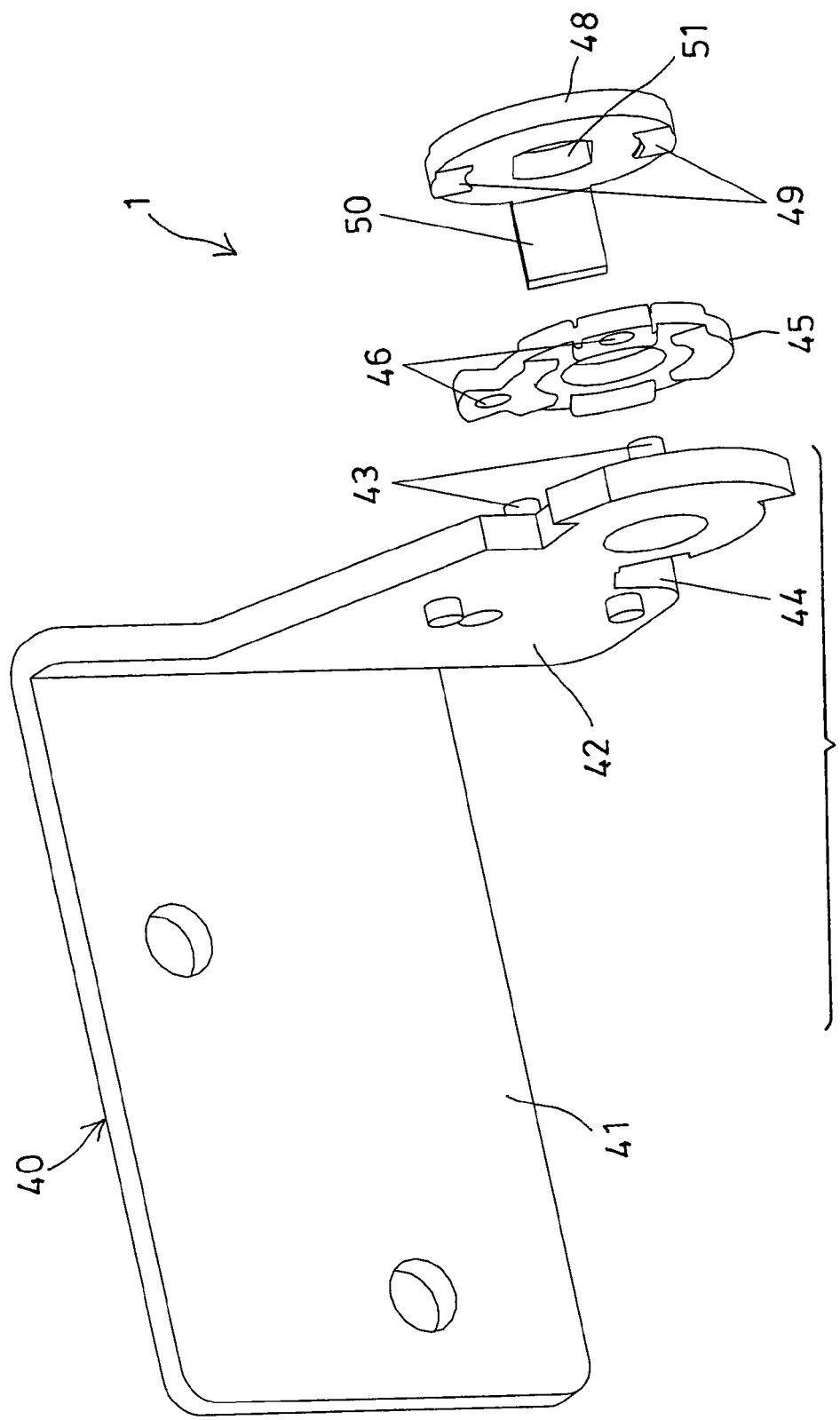
FIG. 3 is another partial exploded view of the carrier device.

As shown in FIG. 2, the anchor plates 45 each include one or more depressions 47 formed therein. One or more (such as two) positioning plates 48 are also engaged onto the respective fasteners 60 and each include one or more catches 49 extended outwardly therefrom for engaging with the selective depressions 47 of the anchor plates 45 and for allowing the positioning plates 48 to be rotated and adjusted relative to the anchor plates 45 and the arm 42 to any selected or predetermined angular position. The positioning plates 48 each include a projection 50 extended outwardly therefrom for selectively engaging with the notch 44 of the arms 42 and for limiting the rotational movement of the arms 42 of the mounting seats 40 relative to the positioning plates 48 and for preventing the arms 42 of the mounting seats 40 from being over rotated relative to the positioning plates 48.

The positioning plates 48 each further include a non-circular hole 51 formed therein, and the fasteners 60 each include a shank 61 having a non-circular cross section engaged through the other end portions 34 of the bars 32 and also engaged through the anchor plates 45 and the positioning plates 48 and having an outer thread 62 formed on one end portion of the shank 61 for threading or engaging with a lock nut 63. The non-circular shanks 61 of the fasteners 60 are rotatably engaged through the other end portions 34 of the bars 32 and the anchor plates 45, but engaged with the corresponding non-circular holes 51 of the positioning plates 48 for allowing the positioning plates 48 to be rotated in concert with the fasteners 60 and for preventing the positioning plates 48 from being rotated relative to the fasteners 60.

One or more (such as two) washers or discs 64 are attached or engaged onto each of the fasteners 60 and each include a non-circular bore 65 formed therein for engaging with the non-circular shank 61 and for solidly attaching or coupling the discs 64 to the fasteners 60 and for preventing the discs 64 from being rotated relative to the fasteners 60. One or more anti-friction washers 66 may further be provided and engaged with the discs 64 and/or the bars 32 of the linkage 30 for frictionally coupling the discs 64 and the fasteners 60 to the bars 32 of the linkage 30 and for allowing the mounting seats 40 to be rotated and adjusted relative to the bars 32 of the linkage 30 to any selected or predetermined angular position (FIGS. 4, 5).

Figure 4:
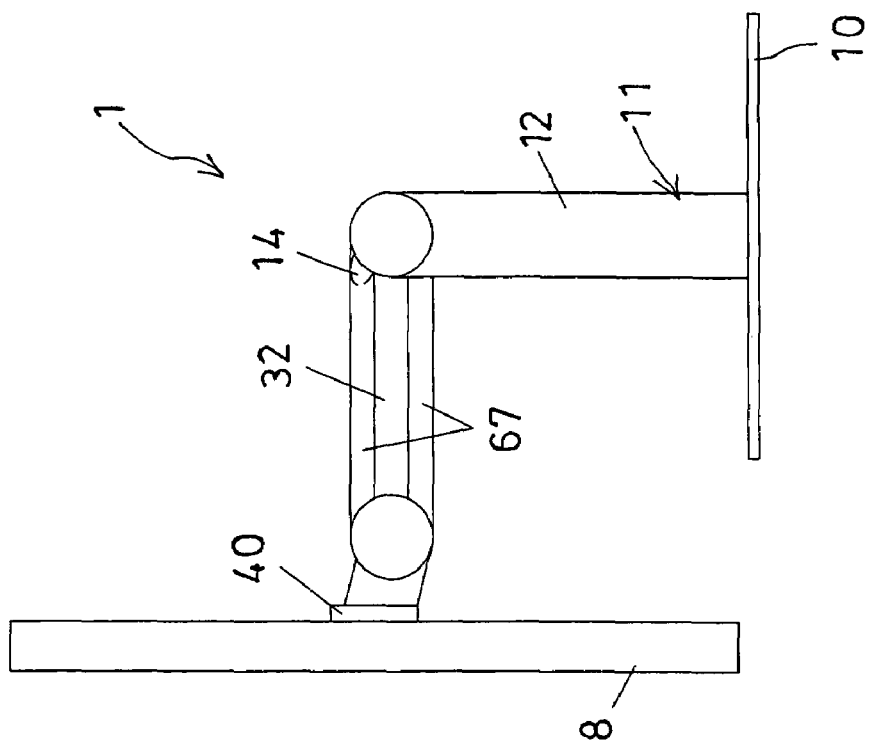
FIG. 4 is a side plan schematic view of the carrier device.
Figure 5:
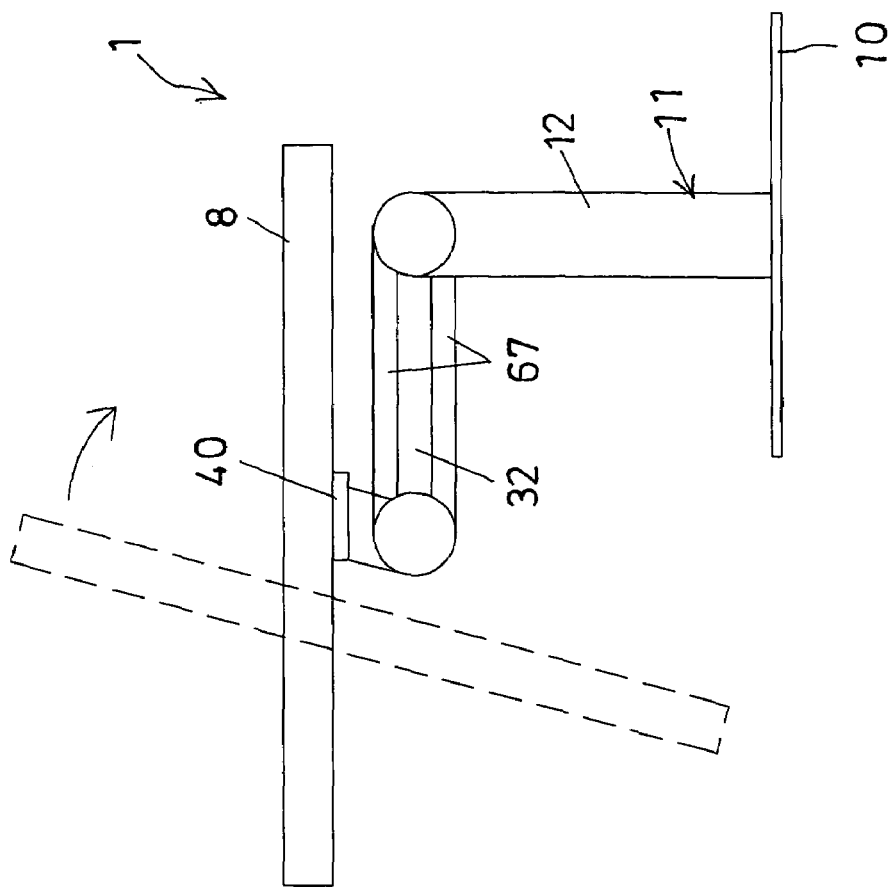
FIGS. 5, 6 are side plan schematics views similar to FIG. 4, illustrating the operation of the carrier device.
Figure 6:
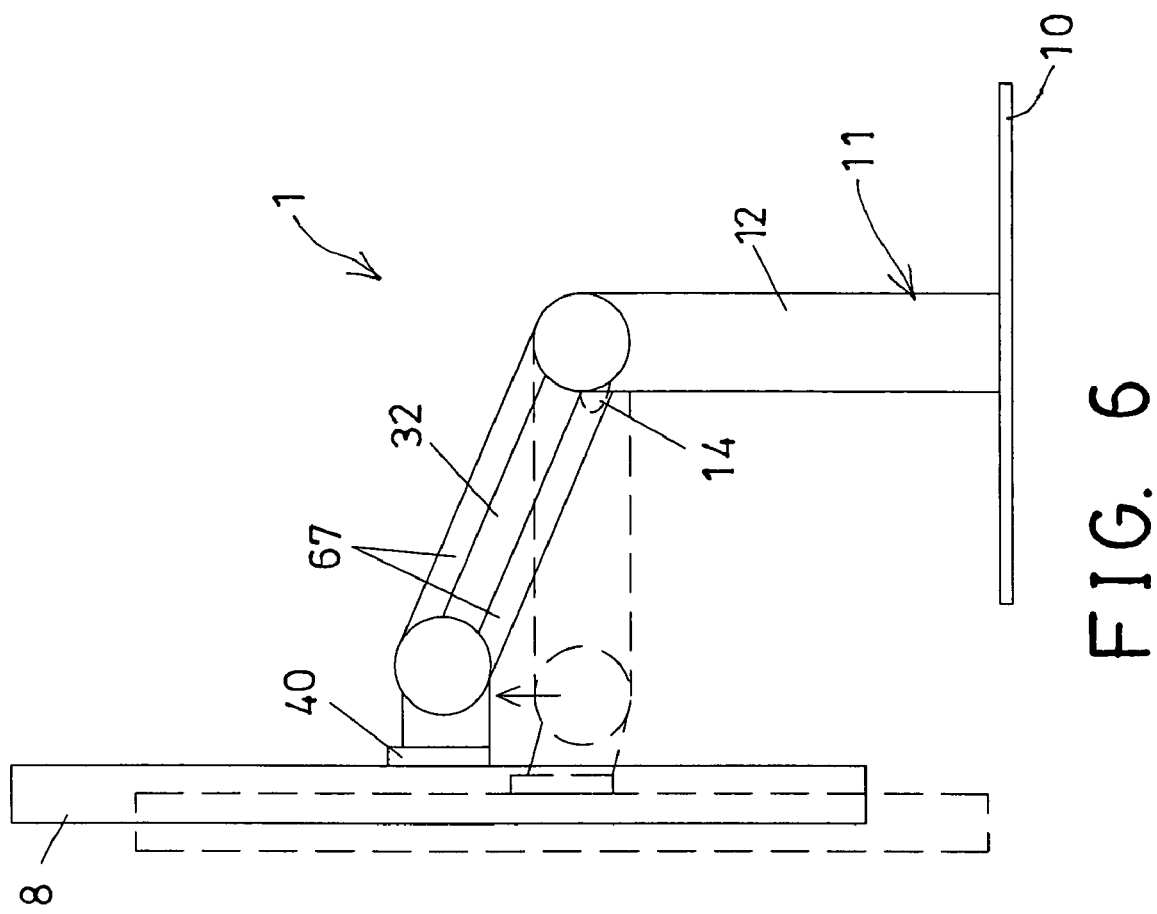

The linkage 30 further includes one or two pairs of levers 67 disposed parallel to each other and attached to the respective bars 32 of the linkage 30 and having the end portions pivotally coupled to the discs 24, 64 for forming a parallelogrammic structure and for further stably or solidly supporting the mounting seats 40 to the columns 12 of the bracket 11 of the supporting base 10 and for allowing the bars 32 of the linkage 30 to be rotated and adjusted relative to the columns 12 of the bracket 11 of the supporting base 10 to any selected or predetermined angular position (FIGS. 4, 6). The mounting seats 40 and the object 8 may thus be adjusted and supported on the columns 12 of the bracket 11 of the supporting base 10 to any selected or predetermined angular position without spring members.

Accordingly, the carrier device in accordance with the present invention includes an improved structure for stably supporting the objects or the like at the selected or suitable angular position and for preventing the carrier device from being collapsed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrier device comprising:
a supporting base including at least one column extended therefrom,
a mounting seat for attaching to an object and including an arm extended from said mounting seat,
a linkage including a bar having a first end and a second end,
a first fastener including a non-circular shank engaged through said first end of said bar and said at least one column of said supporting base,
a first disc including a non-circular bore formed therein for engaging with said non-circular shank of said first fastener and for coupling said first disc to said first fastener and for preventing said first disc from being rotated relative to said first fastener,
a second fastener including a non-circular shank engaged through said second end of said bar and said arm of said mounting seat,
a second disc including a non-circular bore formed therein for engaging with said non-circular shank of said second fastener and for coupling said second disc to said second fastener and for preventing said second disc from being rotated relative to said second fastener, and
a pair of levers disposed parallel to each other and attached to said bar of said linkage and having end portions pivotally coupled to said first disc and said second disc for forming a parallelogrammic structure and for stably supporting said mounting seat to said at least one column of said supporting base and for allowing said bar of said linkage to be rotated and adjusted relative to said at least one column of said supporting base to a selected angular position.

2. The carrier device as claimed in claim 1, wherein said at least one column of said supporting base includes a stop extended therefrom for engaging with said linkage and for limiting said linkage to rotate relative to said at least one column of said supporting base.

3. The carrier device as claimed in claim 2, wherein said linkage includes a linking plate extended from said bar and for engaging with said stop of said at least one column of said supporting base.

4. The carrier device as claimed in claim 1, wherein said supporting base includes a bracket having said at least one column extended from said bracket.

5. The carrier device as claimed in claim 1, wherein said supporting base includes a barrel disposed on top of said at least one column of said supporting base, and said non-circular shank of said first fastener is engaged through said barrel.

6. The carrier device as claimed in claim 1, wherein said first fastener includes an anti-friction washer attached thereon for frictionally engaging with said first disc.

7. The carrier device as claimed in claim 1, wherein said second fastener includes an anti-friction washer attached thereon for frictionally engaging with said second disc.

8. The carrier device as claimed in claim 1, wherein said second fastener includes a positioning plate attached thereon and rotated in concert with said second fastener for positioning said arm of said mounting seat to said second end of said bar.

9. The carrier device as claimed in claim 8, wherein said mounting seat includes an anchor plate attached thereon and rotated in concert with said arm of said mounting seat for engaging with said positioning plate and for positioning said arm of said mounting seat to said second end of said bar.

10. The carrier device as claimed in claim 9, wherein said anchor plate includes at least one depression formed therein, and said positioning plate includes at least one catch extended therefrom for engaging with said at least one depression of said anchor plate and for adjustably positioning said positioning plate to said anchor plate and said arm of said mounting seat to the selected angular position.

11. The carrier device as claimed in claim 9, wherein said anchor plate includes at least one orifice formed therein, and said mounting seat includes at least one peg extended from said arm for engaging with said at least one orifice of said anchor plate and for securing said anchor plate to said arm of said mounting seat.

12. The carrier device as claimed in claim 8, wherein said positioning plate includes a projection extended therefrom for engaging with said arm of said mounting seat and for limiting said arm of said mounting seat to rotate relative to said positioning plate and for preventing said arm of said mounting seat from being over rotated relative to said positioning plates.

13. The carrier device as claimed in claim 12, wherein said mounting seat includes a notch formed in said arm for selectively receiving said projection of said positioning plate.

* * * * *